United States Patent
Perry et al.

(10) Patent No.: US 9,321,165 B1
(45) Date of Patent: Apr. 26, 2016

(54) ANCHOR BOLT DRIVER TOOL

(71) Applicants: Eldridge Perry, Langston, AL (US); Drew Cunningham, Langston, AL (US)

(72) Inventors: Eldridge Perry, Langston, AL (US); Drew Cunningham, Langston, AL (US)

( * ) Notice: Subject to any disclaimer, the term of this patent is extended or adjusted under 35 U.S.C. 154(b) by 241 days.

(21) Appl. No.: 14/165,695

(22) Filed: Jan. 28, 2014

(51) Int. Cl.
*B23B 51/08* (2006.01)
*B25F 3/00* (2006.01)

(52) U.S. Cl.
CPC .. *B25F 3/00* (2013.01); *B23B 51/08* (2013.01)

(58) Field of Classification Search
CPC ........ B23B 51/08; B23B 21/02; B23B 31/00; B25D 17/005; B25D 17/02; B25F 3/00; B25F 1/00
See application file for complete search history.

(56) References Cited

U.S. PATENT DOCUMENTS

| 4,218,795 | A | | 8/1980 | Ernst et al. | |
|---|---|---|---|---|---|
| 4,468,826 | A | | 9/1984 | Moores, Jr. | |
| 5,409,333 | A | * | 4/1995 | Hu | B25B 21/007 279/14 |
| 5,950,507 | A | * | 9/1999 | Wolfe | B25B 21/007 81/177.2 |
| D457,046 | S | | 5/2002 | Boyle et al. | |
| 6,915,936 | B2 | | 7/2005 | Estes | |
| 6,916,983 | B2 | * | 7/2005 | Orsini | H01R 4/66 174/2 |
| 7,726,664 | B2 | | 6/2010 | Peters | |
| 8,061,000 | B2 | | 11/2011 | Santamarina et al. | |
| 8,893,365 | B2 | * | 11/2014 | Fanourgiakis | B25B 31/00 173/51 |
| 8,893,372 | B2 | * | 11/2014 | Fanourgiakis | B25B 31/00 173/51 |
| 2007/0074350 | A1 | * | 4/2007 | Dreps | B23B 51/08 7/158 |
| 2009/0180839 | A1 | * | 7/2009 | Kardas | B25B 23/141 405/259.1 |
| 2013/0161038 | A1 | * | 6/2013 | Prunean | B25B 21/007 173/1 |
| 2015/0101177 | A1 | * | 4/2015 | Hall | B23B 51/08 29/525.11 |
| 2015/0258672 | A1 | * | 9/2015 | Langdon, Jr. | B25D 17/02 29/432 |
| 2015/0290722 | A1 | * | 10/2015 | Foser | B25D 17/005 7/158 |

* cited by examiner

*Primary Examiner* — David B Thomas
(74) *Attorney, Agent, or Firm* — Kyle A. Fletcher, Esq.

(57) ABSTRACT

The anchor bolt driver tool is a tool uniquely configured to attach between a chuck of a hammer drill and a socket such that said tool is able to drive an anchor bolt into concrete. The anchor bolt driver tool includes a first distal end that includes a square-drive socket that is configured to connect with a socket. A second distal end of the anchor bolt driver tool includes a hammer drill chuck member. The hammer drill chuck member includes a series of longitudinally oriented grooves that are provided in order to be gripped via a hammer drill chuck.

9 Claims, 5 Drawing Sheets

ANCHOR BOLT DRIVER TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of tools, more specifically, a driver tool that is configured to drive an anchor bolt.

SUMMARY OF THE INVENTION

An embodiment of the disclosure meets the needs presented above by generally comprising a tool uniquely configured to attach between a chuck of a hammer drill and a socket such that said tool is able to drive an anchor bolt into concrete. The anchor bolt driver tool includes a first distal end that includes a square-drive socket that is configured to connect with a socket. A second distal end of the anchor bolt driver tool includes a hammer drill chuck member. The hammer drill chuck member includes a series of longitudinally oriented grooves that are provided in order to be gripped via a hammer drill chuck.

An object of the invention is to provide a tool that is specifically capable to attach between an anchor bolt socket tool and a hammer drill chuck.

These together with additional objects, features and advantages of the anchor bolt driver tool will be readily apparent to those of ordinary skill in the art upon reading the following detailed description of presently preferred, but nonetheless illustrative, embodiments of the anchor bolt driver tool when taken in conjunction with the accompanying drawings.

In this respect, before explaining the current embodiments of the anchor bolt driver tool in detail, it is to be understood that the anchor bolt driver tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the anchor bolt driver tool.

It is therefore important that the claims be regarded as including such equivalent construction insofar as they do not depart from the spirit and scope of the anchor bolt driver tool. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
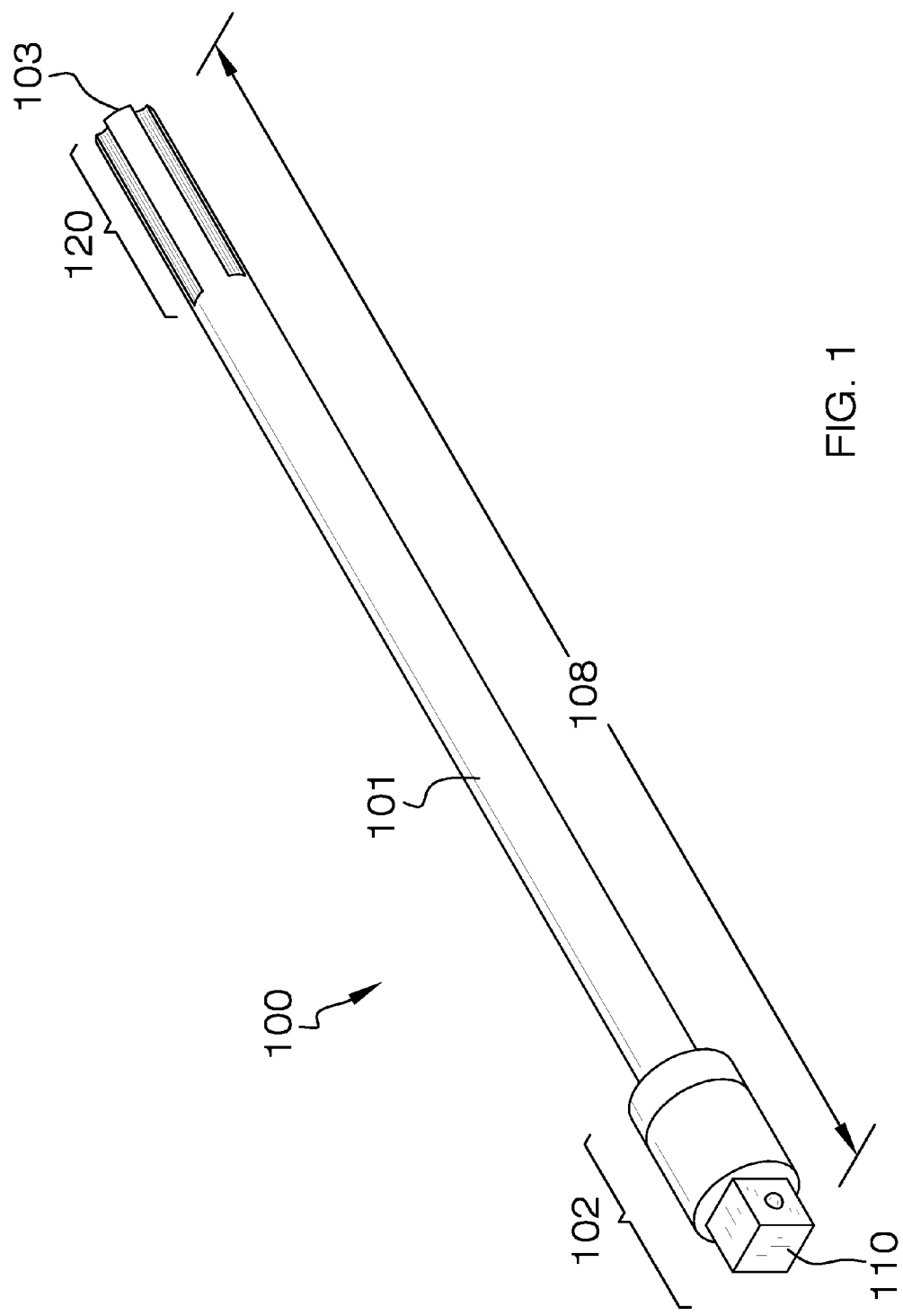
FIG. 1 is a first, perspective view of the anchor bolt driver tool.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 5, the anchor bolt driver tool 100 (hereinafter invention) is further comprised of a bar member 101 having a length 108, and including a first distal end 102. The length 108 ranges from not less than 1 inch to not more than 2 feet. The first distal end 102 features a square-drive 110 thereon, which is configured to attach to an anchor bolt socket 200. Square-drives 110 are well known in the art of hand tools. The size of the square-drive 110 is dependent upon the size of the anchor bolt socket 200. The anchor bolt socket 200 connects between the invention 100 and an anchor bolt 300 that is to be installed in concrete 400.

The bar member 101 has a second distal end 103 that includes a hammer drill chuck member 120 that is uniquely configured to attach to a chuck 251 of a hammer drill 250. The hammer drill chuck member 120 features an array of longitudinally oriented grooves that provide enhanced gripping action to the chuck 251 of the hammer drill 250.

The invention 100 is used to provide a manner of attachment of the anchor bolt socket 200 to the anchor bolt 300 in order to drive the anchor bolt 300 into the concrete 400. The hammer drill 250 provides the rotational movement to drive the anchor bolt 300 into the concrete 400. Traditionally, an end user would be required to use a crescent wrench or a wrench to rotate an anchor bolt nut 301 in order to tighten the anchor bolt 300 into the concrete 400.

Figure 2:
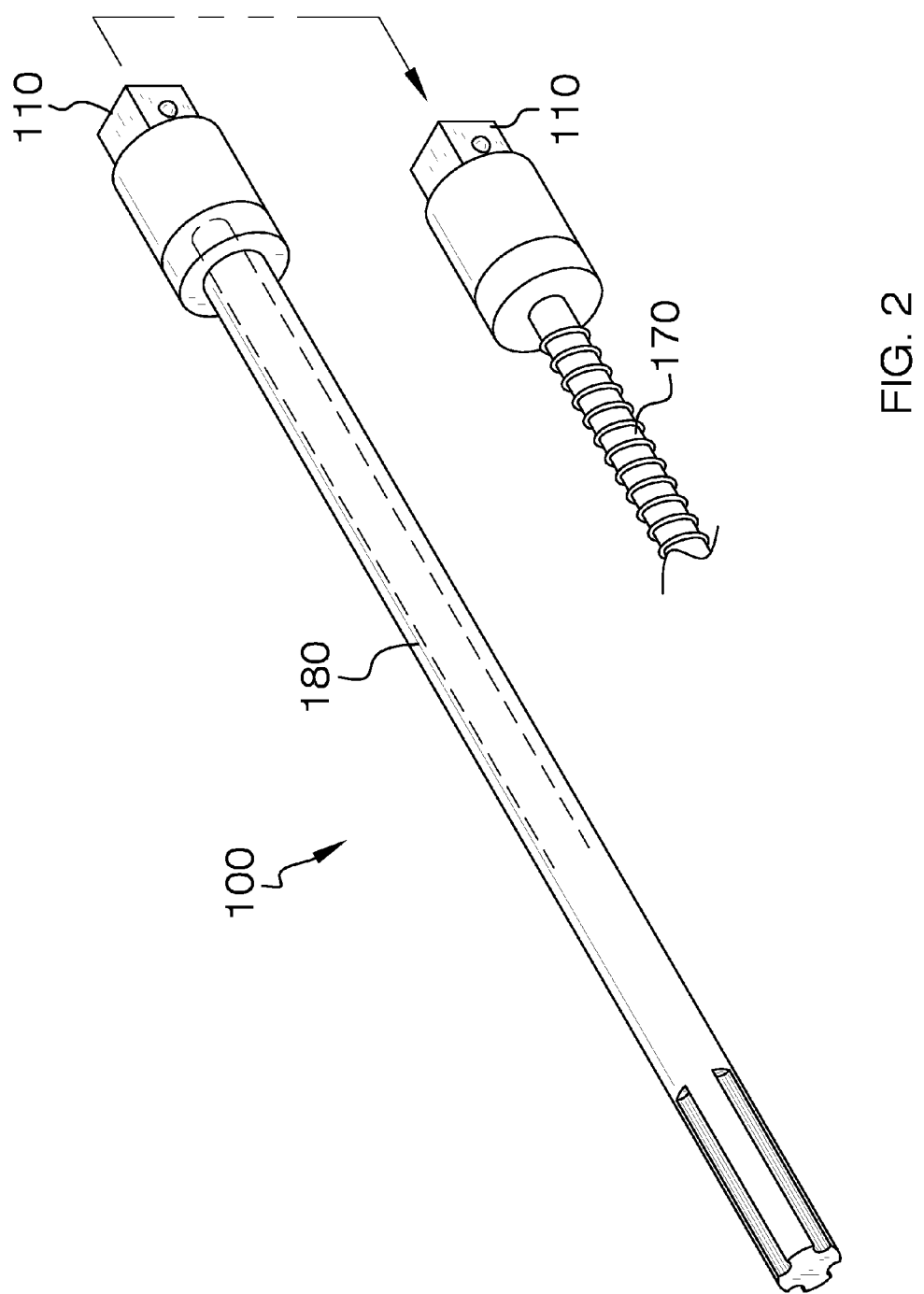
FIG. 2 is a second, perspective view of the anchor bolt driver tool.
Figure 3:
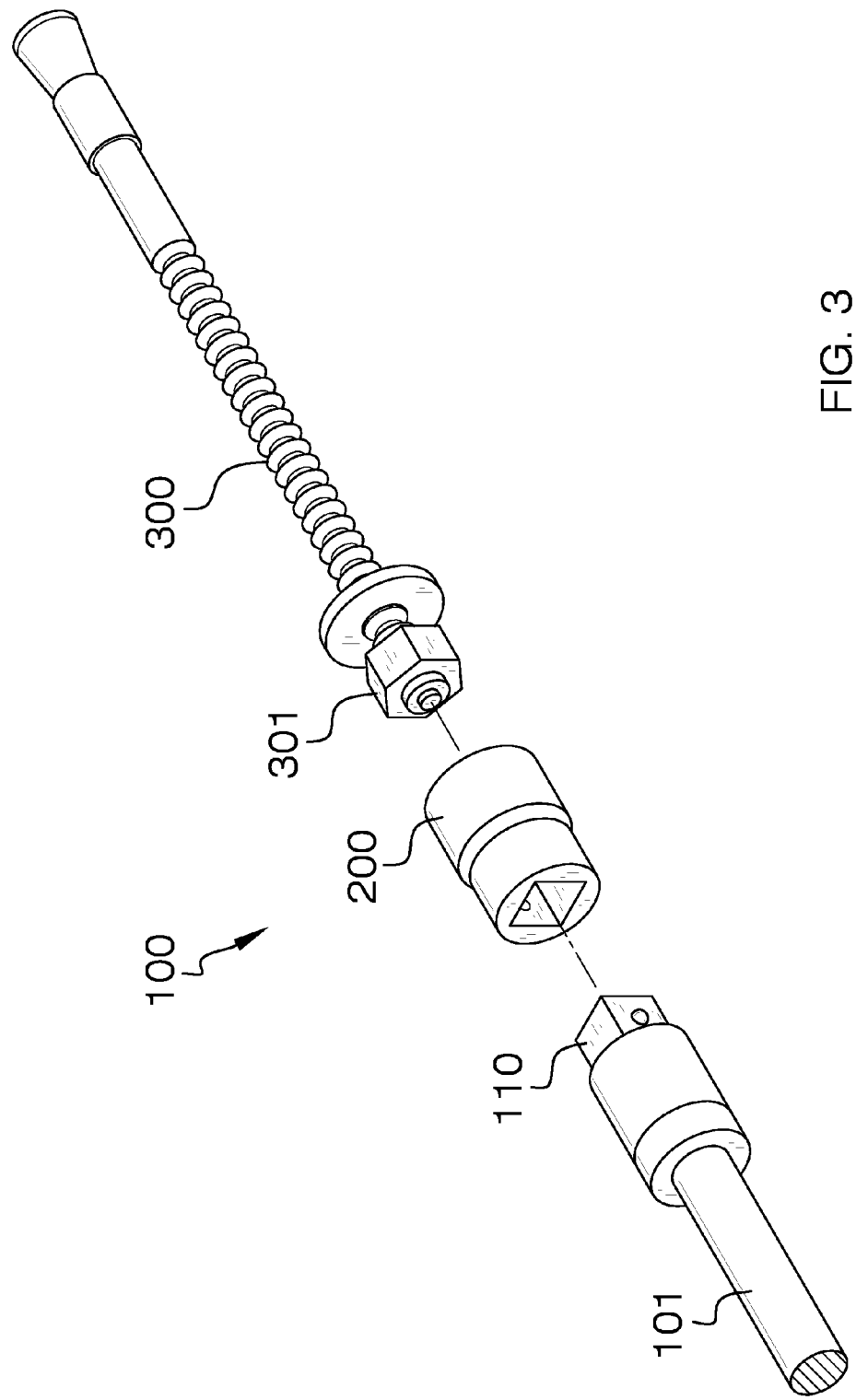
FIG. 3 is an exploded view of the anchor bolt driver tool with respect to the anchor bolt socket and the anchor bolt.
Figure 4:
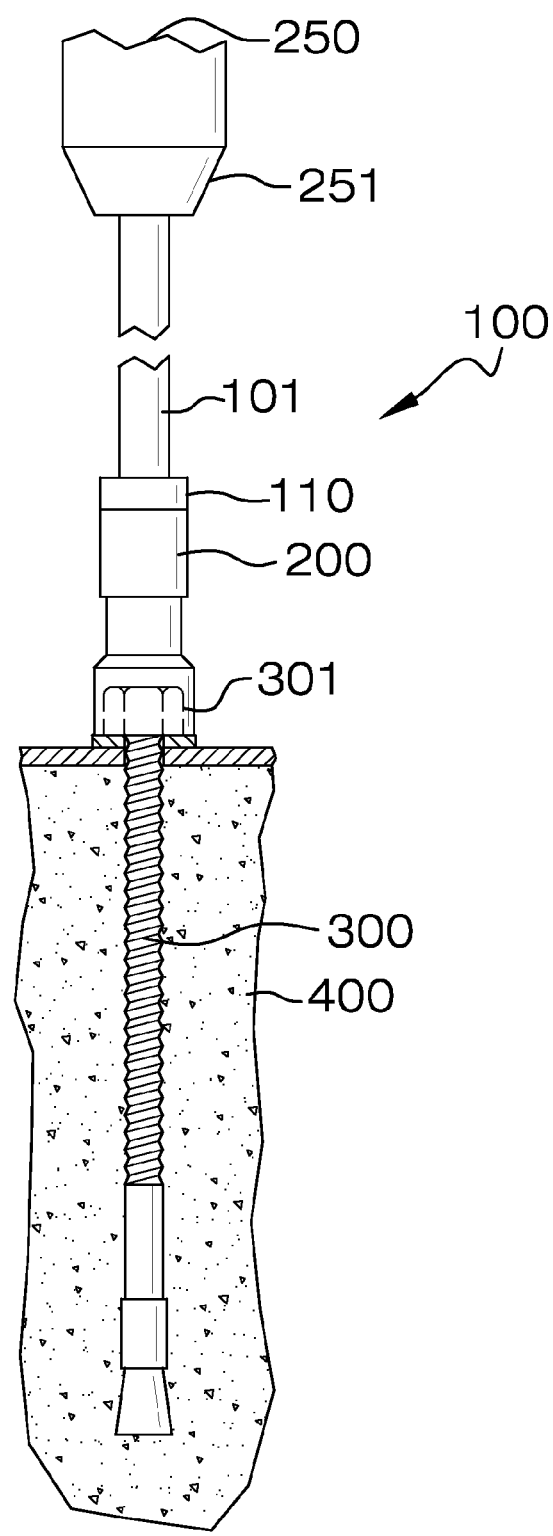
FIG. 4 is a view of the anchor bolt driver tool in use between a hammer drill chuck and the anchor bolt socket and anchor bolt in concrete.
Figure 5:
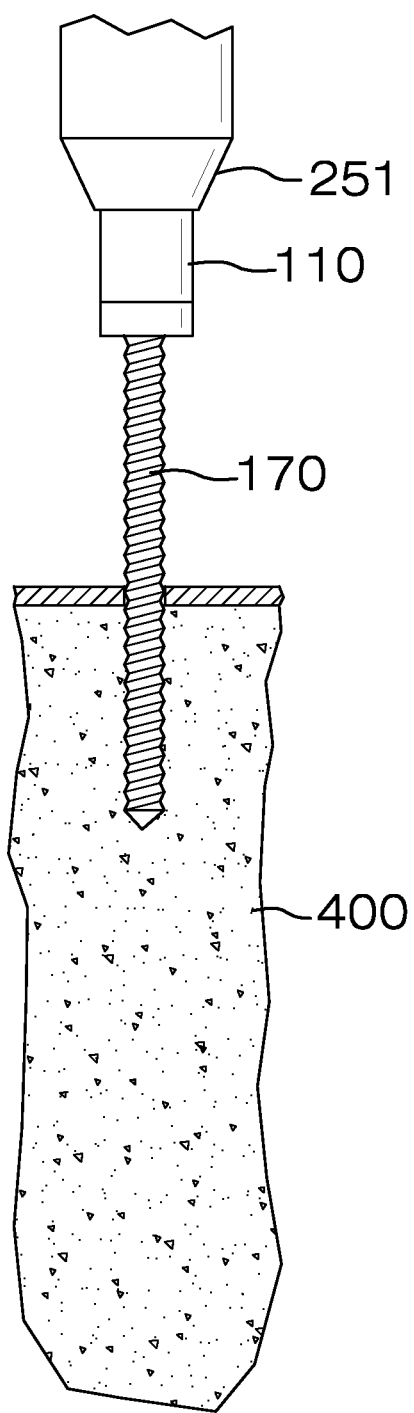
FIG. 5 is an in-use view of the masonry drill bit connected to the chuck of the hammer drill and drilling a hole into concrete.

Referring to FIG. 2, the square-drive 110 is able to be removed from the bar member 101 in order to expose a masonry drill bit 170 that is otherwise hidden inside of the bar member 101. That being said, the bar member 101 includes a channel 180 that is concentrically provided in the bar member 101 in order to insert the masonry drill bit 170 into when the square-drive 110 is in use. The masonry drill bit 170 is provided on a side opposite of the square-drive 110. Referencing FIG. 5, the square-drive 110 shall be inserted into the chuck 251 of the hammer drill 250 in order to utilize the masonry drill bit 170.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An anchor bolt driver tool comprising:
   a bar member having a length defined with a first distal end and a second distal end;
   a square-drive is located at the first distal end, and is configured to be attached to an anchor bolt socket;
   a hammer drill chuck member is located at the second distal end, and is configured to be connected to a chuck of a hammer drill such that the bar member connects between the hammer drill and the anchor bolt socket;
   wherein the hammer drill chuck member features an array of longitudinally oriented grooves that provide enhanced gripping action to the chuck of the hammer drill;
   wherein the square-drive is removed from the bar member in order to expose a masonry drill bit that is otherwise hidden inside of the bar member.

2. The anchor bolt driver tool according to claim 1 wherein the length ranges from one inch to not more than 2 feet.

3. The anchor bolt driver tool according to claim 1 wherein the bar member includes a channel that is concentrically provided in the bar member in order to insert the masonry drill bit into when the square-drive is in use.

4. The anchor bolt driver tool according to claim 3 wherein the masonry drill bit is provided on a side opposite of the square-drive; wherein the square-drive is inserted into the chuck of the hammer drill in order to utilize the masonry drill bit in drilling a hole into concrete for use with an anchor bolt.

5. An anchor bolt driver tool comprising:
   a bar member having a length defined with a first distal end and a second distal end;
   a square-drive is located at the first distal end, and is configured to be attached to an anchor bolt socket;
   a hammer drill chuck member is located at the second distal end, and is configured to be connected to a chuck of a hammer drill such that the bar member connects between the hammer drill and the anchor bolt socket;
   wherein the square-drive is removed from the bar member in order to expose a masonry drill bit that is otherwise hidden inside of the bar member.

6. The anchor bolt driver tool according to claim 5 wherein the length ranges from one inch to not more than 2 feet.

7. The anchor bolt driver tool according to claim 5 wherein the hammer drill chuck member features an array of longitudinally oriented grooves that provide enhanced gripping action to the chuck of the hammer drill.

8. The anchor bolt driver tool according to claim 7 wherein the bar member includes a channel that is concentrically provided in the bar member in order to insert the masonry drill bit into when the square-drive is in use.

9. The anchor bolt driver tool according to claim 8 wherein the masonry drill bit is provided on a side opposite of the square-drive; wherein the square-drive is inserted into the chuck of the hammer drill in order to utilize the masonry drill bit in drilling a hole into concrete for use with an anchor bolt.

\* \* \* \* \*